United States Patent [19]

Leistner

[11] Patent Number: 5,482,419
[45] Date of Patent: Jan. 9, 1996

[54] NAIL WITH OFFSET REINFORCED HEAD

[76] Inventor: Herbert E. Leistner, 167 Sweeney Ave., Toronto, Ontario, Canada

[21] Appl. No.: 281,165

[22] Filed: Jul. 27, 1994

[51] Int. Cl.⁶ ............................. F16B 15/00; F16B 15/08
[52] U.S. Cl. ........................... 411/442; 411/488; 411/923
[58] Field of Search ................................. 411/440, 441, 411/442, 443, 481, 486, 439, 923, 488

[56] References Cited

U.S. PATENT DOCUMENTS

| | | |
|---|---|---|
| 2,940,081 | 6/1960 | Juilfs . |
| 3,031,670 | 5/1962 | Sillars . |
| 3,152,334 | 10/1964 | Lingle . |
| 3,736,198 | 5/1973 | Leistner . |
| 3,861,526 | 1/1975 | Leistner . |
| 3,935,945 | 2/1976 | Smith et al. ......................... 411/442 X |
| 4,002,098 | 1/1977 | Colechia ................................ 411/443 |
| 4,442,965 | 4/1984 | Leistner . |
| 4,711,980 | 12/1987 | Leistner . |
| 5,056,976 | 10/1991 | Sygnator et al. . |
| 5,060,797 | 10/1991 | Sygnator ............................ 411/442 X |

*Primary Examiner*—Neill R. Wilson

[57] ABSTRACT

A nail with offset reinforced head, adapted to be formed into a strip of similar collated nails, comprises a nail shank, an integral nail head disposed in an offset relationship with the nail shank, at least one reinforcing ridge member provided integrally on a lower surface of the head and extending from the shank to an edge portion of the head. The ridge member and a lower surface of the head define a recess for receiving an overlapping head portion of a collated nail.

9 Claims, 2 Drawing Sheets

NAIL WITH OFFSET REINFORCED HEAD

FIELD OF THE INVENTION

The invention relates to nails designed for use in nail strips. Such strips of nails are used in power operated nailing applicators. The strips are located in a feed device or magazine, and are progressively fed one at a time, into registration with a piston, which drives the end most nail in the strip and separates it from the strip and drives it into a work piece.

BACKGROUND OF THE INVENTION

The design of nails for use in a nail strip must take into account a variety of factors.

1. The nail itself must have adequate holding power for the purpose intended, this factor usually being determined by the thickness of the nail shank.

2. The nail head must have adequate holding power to withstand driving forces developed by the nailing piston, i.e. it must not drive into the work piece too far.

3. The nail head must have sufficient strength to secure the work piece into which the nail is driven.

4. The nail head should be of such a design that it does not interfere with the shanks of adjacent nails in the strip. Any interference between the nail head of one nail and the shank in the next nail, will result in increased spaces between the nails in the strip and cause angular misalignment. Angular misalignment will cause either jamming of the nailing tool or misfiring. The extra space reduces the number of nails in the strip. This in turn will increase the frequency with which the applicator must be temporarily taken out of service while the nailing strip is replenished.

5. The nail head must be of such a design that it facilities the assembly and packaging of the nails into the strips, without the requirement of special handling.

6. The nail head must be such that it is capable of being formed at high speed on relatively speaking conventional machines, so as to avoid undue costs.

7. The nail head must be securely formed on the shank so that it does not become detached during use.

A large number of different nail designs have been proposed in the past, which are designed to meet some of these objectives. Examples are shown in Sygnator U.S. Pat. No. 5,056,976, Lingle U.S. Pat. No. 3,152,334, Sillars U.S. Pat. No. 3,031,670, and Juilfs U.S. Pat. No. 2,940,081.

It is not necessary to analyze each of these earlier patents. It is sufficient to say that while individually they may have met one or more of the foregoing objectives, individually none of them have met all of these objectives, and, even when considered collectively, none of them would be capable of meeting all of these objectives.

Most of these proposals have been based on a nail having a nail head having an effective centre which is offset to one side of the central axis of the nail shank. In particular, such nail heads have a portion which is non-circular, and is either formed with a notch, or a portion of the head is simply clipped off. The forming of a notch in the nail head results in certain problems in assembling the nails into a strip. In addition, it is difficult to form such notched nail heads with repeatable accuracy bearing in mind the type of tooling and the speeds of operation.

A nail having a head portion which is simply clipped off, while be readily manufactured and assembled, presents problems in that the holding power of the nail head is reduced.

In addition, any asymmetric shaped head can easily be cracked or snapped off while it is driven into the workpiece.

An improved form of nail head meeting most of these objectives is shown in U.S. patent application Ser. No. 08/202,016, inventors Antonio Cario, Vittorio Iannucci and Eberhard F. Leistner, filed Feb. 25, 1994, and owned by the same owner as the present application.

BRIEF SUMMARY OF THE INVENTION

With a view to provide a nail meeting all the foregoing objectives, the present invention provides a nail with offset reinforced head, adapted to be formed into a strip of collated nails, comprising a nail shank, a nail head provided integrally on one end of said nail shank and disposed in an offset relationship with said nail shank, said nail head defining a first lower surface which is adapted to overlap an upper surface of an adjacent nail head and a second lower surface between said first lower surface and said one end of said nail shank, at least one reinforcing ridge member provided integrally on said second lower surface and extending from an end portion of said nail shank where said nail head is joined to an edge portion of said nail head.

According to a preferred embodiment of the present invention, the nail defines a central plane of symmetry which coincides with the longitudinal central plane of said strip of nails, and wherein two reinforcing ridge members are provided on both sides of said central plane of symmetry, extending respectively from two opposite sides of the end portion of said nail shank, where said nail head is joined, to the edge portions of said nail head.

Another feature of the invention provides that each ridge member is provided with a longitudinally extending ridge surface generally facing and extending along a peripheral region of said first lower surface.

A further feature of the invention provides that each ridge member extends generally at an angle with respect to said central plane of symmetry.

A further feature of the invention provides that said ridge member and said first lower surface define a recess for receiving an overlapping head portion of a collated nail.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF A SPECIFIC EMBODIMENT

Figure 1:
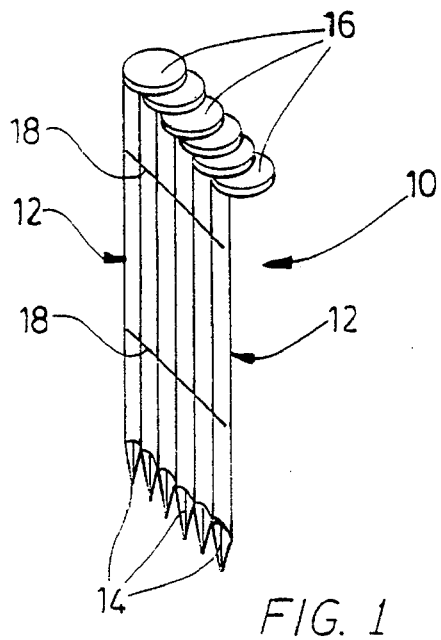
FIG. 1 is a perspective view of a strip of an embodiment of nails illustrating the present invention.

Referring now in more detail to the drawings in which like reference numerals represent like parts throughout the several views, FIG. 1 shows a perspective view of a strip of an embodiment of nails, represented generally by reference numeral 10. For illustrative purposes, the strip of nails 10 consists of only six nails 12, each having a nail shank 14 and an integral offset nail head 16.

The nail 12 has an offset head 16 which is oval in shape although it may be of any other shapes, such as circular, non-circular, or D-shaped, etc.

The nails 12 are collated and oriented side by side with nail shanks 14 abutting against one another and nail heads 16 being offset in a common direction relative to the shanks 14 and overlapping one another, as illustrated in FIG. 1.

Attachment means such as extruded plastic, glue, tape, or welded wires, etc. may be used to hold the nails together. In this example, wires 18 are used, and are welded to the nail shanks.

The nails 12 are collated and secured together to form a strip of nails of any desired length. The strip of nails is adapted to be loaded into a nail magazine of a nail driving machine (not shown). The nails 12 can then be precisely and successively fed to a nail applicator (not shown), or the like, for driving the nails 12 one by one into a work piece.

Figure 2:
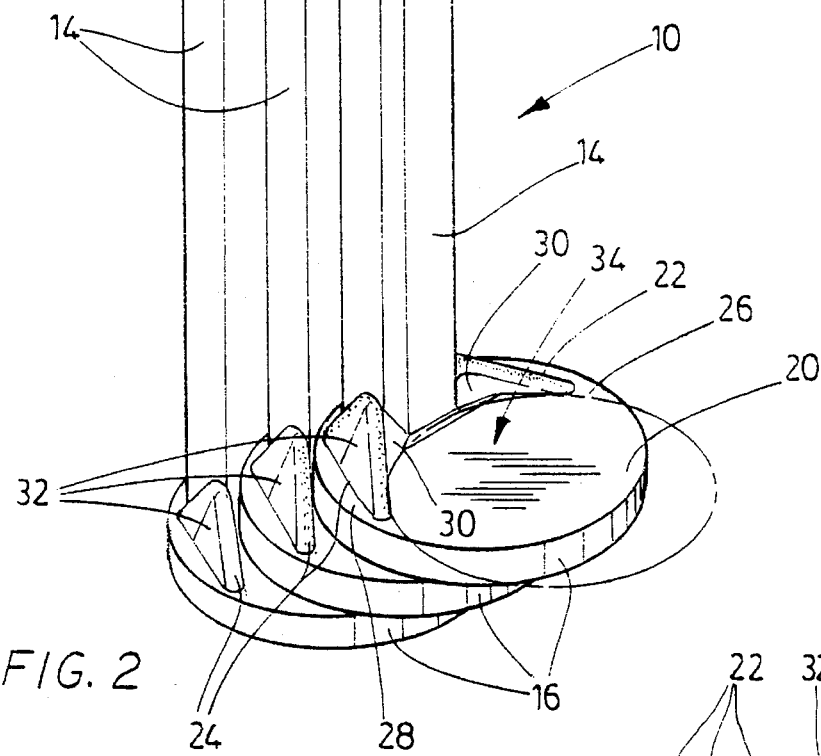
FIG. 2 is an enlarged perspective view showing the embodiment of FIG. 1, with the reinforcing ridges provided on the bottom surfaces of the nail heads and with the shanks cut away.

The lower region of a nail head 16 defines a lower surface 20 on which a portion of an upper surface of a collated nail head abuts, as illustrated by phantom line in FIG. 2. This surface 20 is at the underside of the offset nail head 16 immediate in front of the surface where the shank 14 joins the head 16. This renders the shanks 14 to be able to dispose parallel to and abut against one another forming a strip of contiguous nails 10.

According to the preferred embodiment shown in FIG. 2, two reinforcing ridge members 22, 24 are provided on the lower region of the nail heads 16.

The ridge members 22, 24 are respectively provided on lower surfaces 26, 28 of the nail head 16. The ridge members 22, 24 generally extend from the end portion of the shank 14, where the head 16 is adjoined, to the edge portions of the nail head 16.

Figure 3:
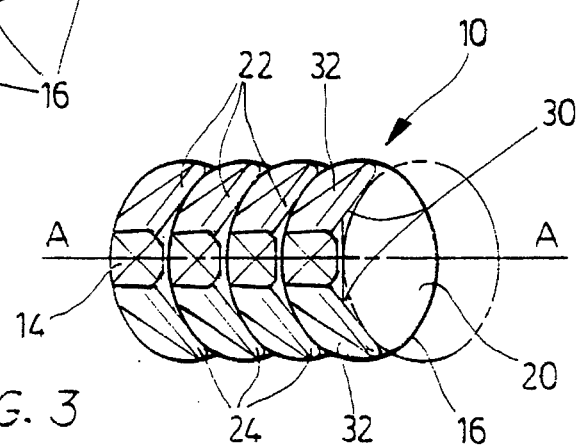
FIG. 3 is a bottom end view of the nails of FIG. 1.

The ridge members 22, 24 may extend generally straightly towards the edge portion, as shown in FIG. 2 or 3, or they may extend in a curve generally along the edge portion of the head 16.

It will be seen that the ridge members 22, 24 cover almost the entire areas of the surfaces 26, 28 respectively.

According to the present embodiment, each ridge member 22 or 24 tapers towards the edge portion of the head 16. Each ridge member 22 or 24 defines a generally inwardly facing ridge surface 30 and an outwardly facing ridge surface 32. The inwardly facing ridge surface 30 slopes downwardly towards a peripheral portion of the lower surface 20 of the nail head 16 and the outwardly facing ridge surface 32 slopes downwardly towards an edge portion of the head 16.

According to the present embodiment, the two ridge surfaces 30, 30 of a nail 12 and the lower surface 20 together define a recess 34 for receiving an overlapping head portion of a collated nail 12. The overlapping head portion of the collated nail 12 is adapted to be received in the recess 34 without interference from the two ridge members 22, 24.

In forming a strip of nails 10, the nails 12 are collated to one another with their shanks 14 oriented in a closely spaced, parallel relationship with respect to one another and with their heads 16 overlapping one another at a portion thereof. The recesses 34 are adapted to receive and hold the overlapping head portions in such a manner that the nails 12 are formed into a strip of contiguous nails 10 oriented along a common direction.

FIG. 3 is a bottom end view of the collated nails 12 of the present invention.

The nails 12 define a central plane of symmetry A—A. This central plane of symmetry A—A coincides with the longitudinal central plane of the strip of nails 10. According to the preferred embodiment, the ridge members 22, 24 are symmetric about the plane of symmetry A—A and are disposed at an acute angle to the plane of symmetry A—A. It is appreciated that the ridge members 22, 24 can be asymmetric and disposed at an obtuse angle, or at any other angle to the plane of symmetry A—A.

The ridge members 22, 24 serve to reinforce the head 16 on the shank 14 so that the head 16 will not break off from the shank 14 when force is exerted on the offset head 16 or when the nail 12 is to be pulled out of a work piece by a nail-prying tool.

Furthermore, the ridge members 22, 24 of the present invention are adapted to engage with a work piece, into which the nail 12 is driven, so as to stabilize the nail head 16 in a lateral sense.

Figure 4:
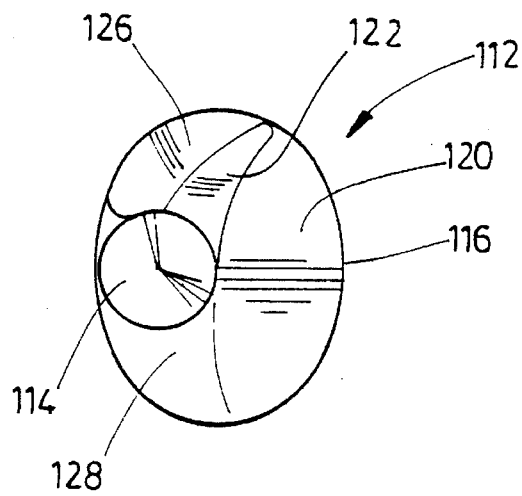
FIG. 4 is a bottom end view of a second embodiment of the nail of the present invention.

FIG. 4 is a bottom end view of a second embodiment of the nail of the present invention. In FIG. 4, a nail 112 comprises a nail shank 114 and an integral offset head 116.

The lower region of the head 116 defines a lower surface 120 on which a portion of an upper surface of a collated nail head abuts. This surface 120 is at the underside of the offset head 116 immediate in front of the region where the shank 114 joins the head 116.

One reinforcing ridge member 122 is provided on a lower surface 126 of the head 116. The ridge member 122 extends generally from an end portion of the shank 114, where the head 116 is adjoined, to an edge portion of the head 116.

Although it has been shown in this embodiment that the ridge member 122 extends from one side of the shank 114 across the lower surface 126, it is understood that the ridge member can extend from the other side of the shank 114 across the lower surface 128.

Figure 5:
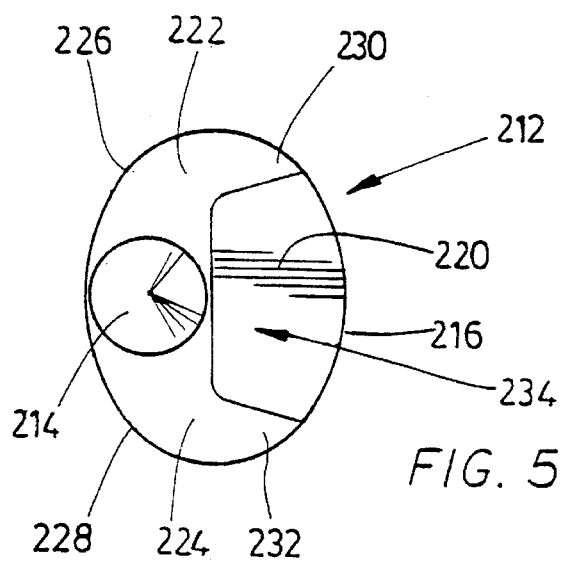
FIG. 5 is a bottom end view of a third embodiment of the nail of the present invention.

FIG. 5 is a bottom end view of a third embodiment of the nail of the present invention. In FIG. 5, a nail 212 comprises a nail shank 214 and an integral offset head 216.

Similar to the first and the second embodiments, the lower region of the head 216 defines a lower surface 220 on which a portion of an upper surface of a collated nail head abuts. This surface 220 is at the underside of the offset head 216 immediate in front of the region where the shank 214 joins the head 216.

Two reinforcing ridge members 222, 224 are provided on the lower surfaces 226, 228 respectively. The ridge members 222, 224 extend across and may cover the entire surfaces 226, 228 around the surface 220.

The ridge members 222, 224 and the lower surface 220 together define a recess 234 for receiving an overlapping head portion of a collated nail.

The ridge members 222, 224 are provided with inturned end portions 230, 232 adapted to orient the collated nails 212 in a nail strip along a common direction.

Although it has been described and shown in FIG. 2 that the reinforcing ridge members 22,24 tapers towards the edge portions of the head 16, it is appreciated that the ridge members 22, 24 can extend uniformly throughout the entire length.

Figure 6:
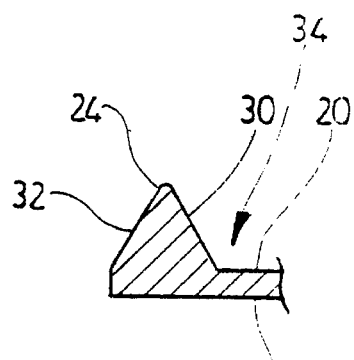
FIG. 6 is a sectional view showing a triangular cross section of a reinforcing ridge member.

FIG. 6 is a sectional view of the reinforcing ridge member 24 of the nail 12 of FIG. 2. In this embodiment, the ridge member 24 has a triangular cross section. The triangular ridge member 24 define the generally inwardly and outwardly facing ridge surfaces 30, 32.

The ridge surface 30 and the surface 20 define the recess 34 for receiving an overlapping head portion of a collated nail.

Figure 7:
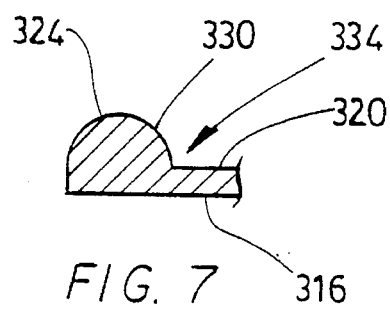
FIG. 7 is a sectional view, similar to FIG. 6, showing a semi-circular cross section of a reinforcing ridge member.
Figure 8:
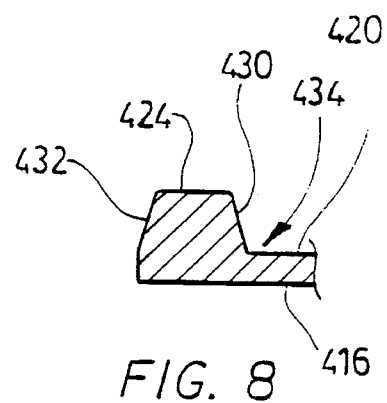
FIG. 8 is a sectional view, similar to FIG. 6, showing a trapezoidal cross section of a reinforcing ridge member.

FIG. 7 and 8 are two sectional views similar to FIG. 6 showing other possible shapes of the reinforcing ridge member of the present invention.

FIG. 7 shows a ridge member 324 of semi-circular cross section. The ridge member 324 defines an arcuate surface 330. The arcuate surface 330 and the surface 320 of the head 316 together define a recess 334 for receiving an overlapping head portion of a collated nail.

FIG. 8 shows a ridge member 424 of trapezoidal cross section. The ridge member 424 defines an inwardly facing surface 430 and an outwardly facing surface 432. The inwardly facing surface 430 and the surface 420 together define a recess 434 for receiving an overlapping head portion of a collated nail.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A nail with an offset reinforced head, adapted to be formed into a strip of similar collated nails, comprising:

a nail shank;

a nail head provided integrally on one end of said nail shank and disposed in an offset relationship with said nail shank; said nail head defining a first lower surface which is adapted to overlap an upper surface of a collated nail head, and a second lower surface between said first lower surface and said one end of said nail shank, and, at least one reinforcing ridge member provided integrally on said second lower surface and extending from said one end of said nail shank to an edge portion of said nail head, said at least one reinforcing ridge member and said first lower surface of said nail head defining a recess for receiving an overlapping head portion of a collated nail, whereby said overlapping head portion of said collated nail is adapted to be received in said recess without interference from said at least one ridge member.

2. A nail with an offset reinforced head as claimed in claim 1 wherein two reinforcing ridge members are provided on said second lower surface.

3. A nail with an offset reinforced head as claimed in claim 1 further defining a central plane of symmetry coincides with the longitudinal central plane of said strip of nails, and wherein there are two reinforcing ridge members respectively positioned symmetrically on both sides of said central plane of symmetry, and defining between then said recess.

4. A nail with an offset reinforced head as claimed in claim 1 wherein said at least one ridge member is provided with a longitudinally extending and downwardly sloping ridge surface generally facing and extending along a peripheral region of said first lower surface.

5. A nail with an offset reinforced head as claimed in claim 3 wherein said at least one ridge member is extending generally at an angle with respect to said central plane of symmetry.

6. A nail with an offset reinforced head as claimed in claim 1 wherein said at least one ridge member tapers towards the edge portion of said nail head.

7. A nail with an offset reinforced head as claimed in claim 1 wherein said at least one ridge member extends uniformly towards the edge portion of said nail head.

8. A nail with an offset reinforced head as claimed in claim 1 wherein said at least one ridge member extends in a curve along the edge portion of said nail head.

9. A nail with an offset reinforced head as claimed in claim 1 wherein said at least one ridge member has an inturned end portion.

* * * * *